July 2, 1946.  H. F. BROWN  2,403,336
BORING CHUCK
Filed Feb. 16, 1944  2 Sheets-Sheet 1

Inventor
HARRY F. BROWN,
By J. Windsor Davis
Attorney

July 2, 1946.  H. F. BROWN  2,403,336
BORING CHUCK
Filed Feb. 16, 1944  2 Sheets-Sheet 2
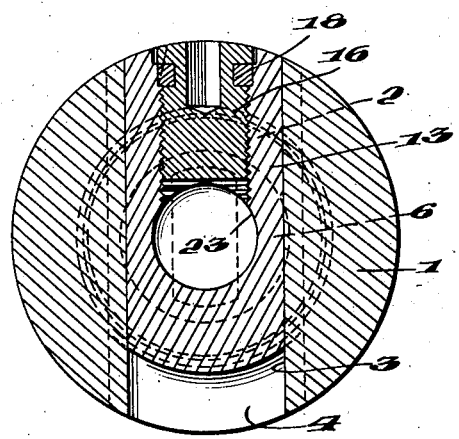
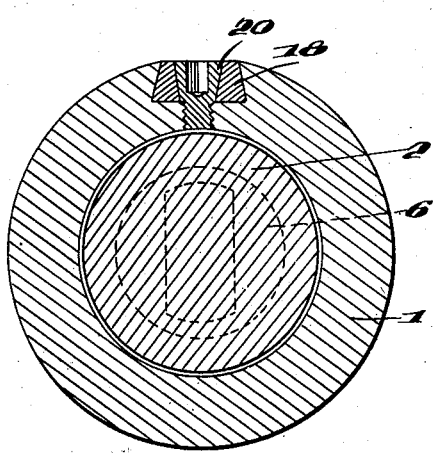
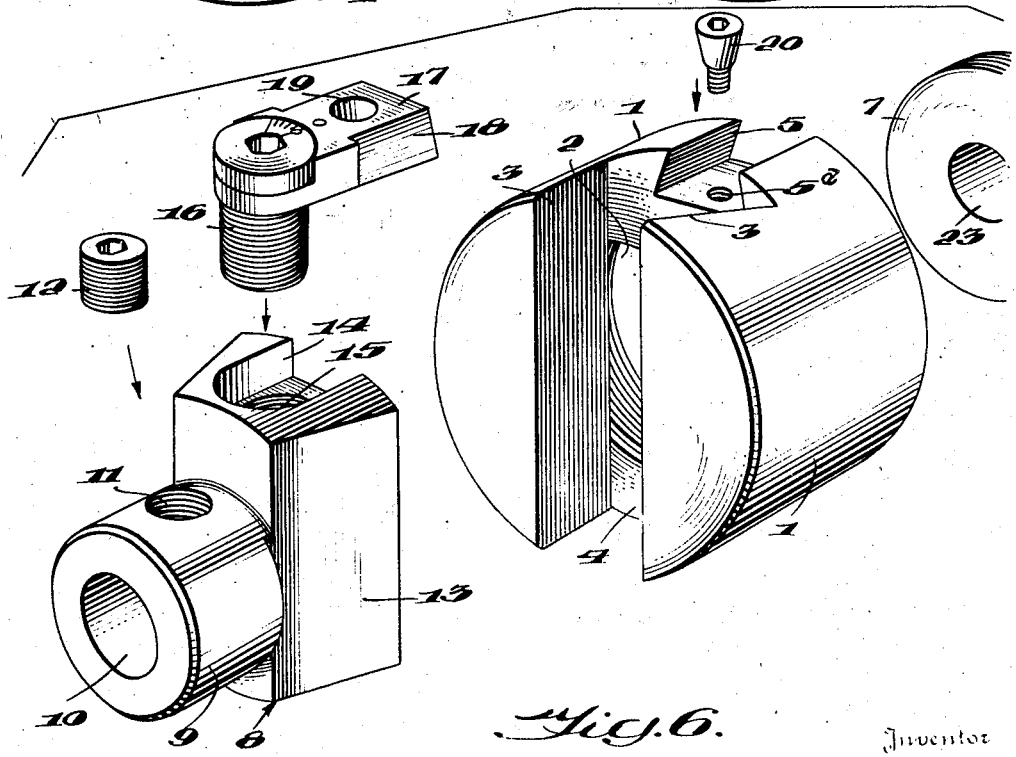
Inventor
HARRY F. BROWN,
J. Windsor Davis
Attorney Patented July 2, 1946

2,403,336

UNITED STATES PATENT OFFICE 2,403,336

BORING CHUCK

Harry F. Brown, Chicago, Ill.

Application February 16, 1944, Serial No. 522,661

3 Claims. (Cl. 279—6)

This invention relates to boring chucks of the type known as an eccentric chuck and has for its principal object to provide a chuck of solid, sturdy construction which is composed of the minimum number of parts and which can be made at substantially reduced costs as compared to all other similar chucks now on the market.

It is the general practice to drill holes with a drill chuck or other tool and thereafter to bore them out to size. This chuck is designed to use standard boring tools generally having one cutting edge to accomplish the boring operation. The chucks now on the market have gibs and screws, the screws being employed to take up wear but the disadvantage of such arrangement is that they lost rigidity and the bits weave resulting in a hole that is not true. An object of this invention is to provide a chuck in which the shank is separate and screws directly into the chuck body, the threads being large and heavy so that as the shank is tightened in the body it forces the chuck head solidly against the chuck body. Thus as wear occurs a re-tightening of the shank into the body and against the head again makes the entire chuck solid and rigid so that the bit does not wobble or weave.

Another object is to provide a chuck construction which will have a greater range of traversing movement and which can be locked solidly even in extreme positions.

A further object is to provide a chuck with greater room for the insertion of a tool in order to increase the number of types of tools which can be used therein. Conventional chucks have shallow openings for reception of the bits. By my construction it is possible to allow an opening which will extend into the shank thereby easily doubling the available space.

Figure 1:
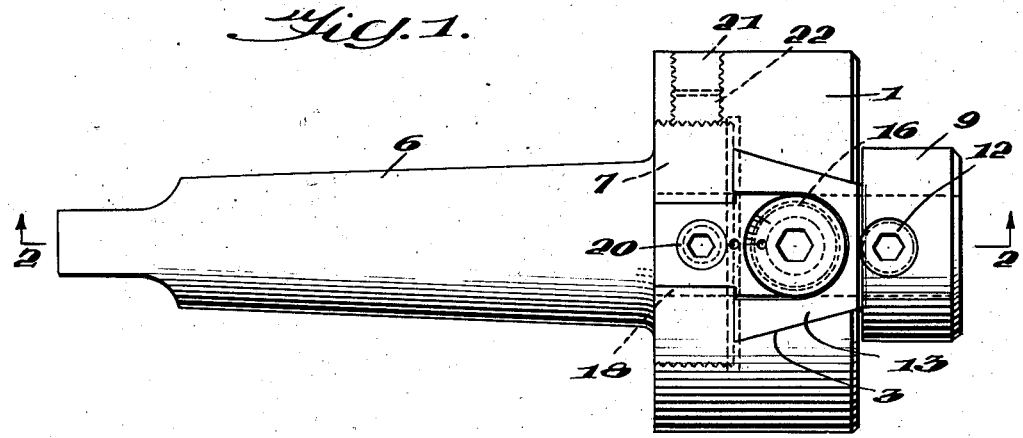
Figure 2:
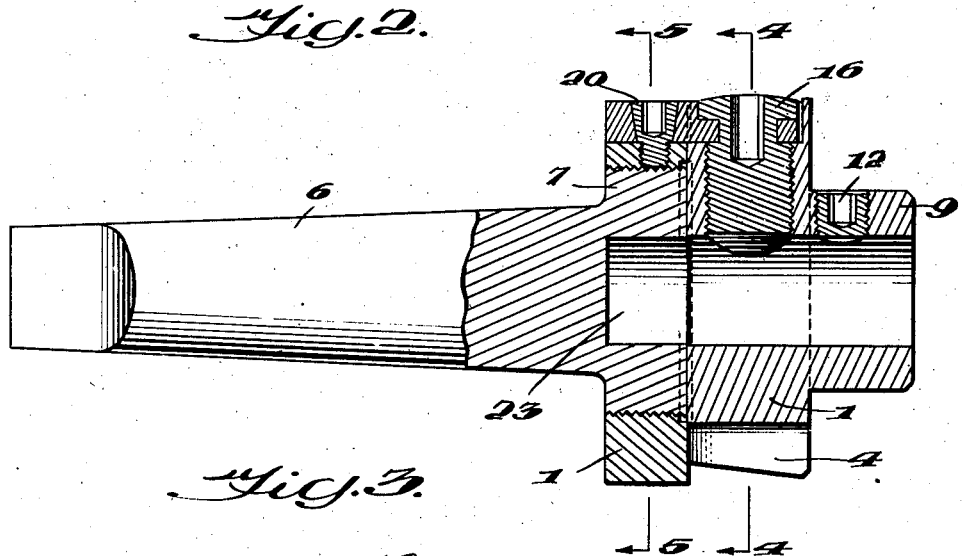
Figure 3:
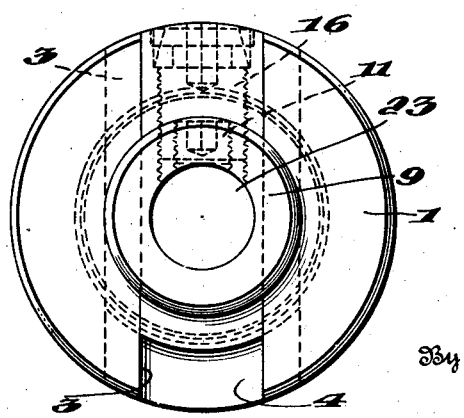

Other objects and advantages will become hereinafter more fully apparent as reference is had to the accompanying drawings in which my invention is illustrated and in which Figure 1 is an elevation of my improved chuck taken from the top thereof, Figure 2 is a longitudinal diametric section taken along the line 2—2 of Figure 1, Figure 3 is an end elevation of the right end of Figure 1, Figure 4 is a transverse section taken along the line 4—4 of Figure 2, Figure 5 is a transverse section taken along the line 5—5 of Figure 2, and Figure 6 is a perspective exploded view of the chuck.

More particularly, 1 indicates the chuck body which has a large threaded opening 2 extending longitudinally thereinto from one end. The body is slotted transversely across the other end with the sidewalls 3 thereof converging to dovetail shape, the opening 2 extending into the bottom 4 of the dovetail slot while the sidewalls 3 cut across a segment of the opening 2. A second and smaller dovetail slot 5 is cut in outside surface of the body outwardly of the threaded opening 2 in such manner that a plane containing the axis of the chuck body and bisecting the dovetail slot 3 will also bisect it. This slot 5 has a threaded opening 5a in the bottom thereof.

A shank 6 is enlarged and is threaded at its end 7 and screws into the threaded opening 2 of the chuck body. The shank may be tapered or cylindrical and of a diameter and length as may be desired to fit into the machine which drives the chuck.

The chuck head 8 is composed of a head 9 of cylindrical shape having a central opening 10 therethrough to receive a tool, such as a bit or drill, and is provided with a threaded opening 11 for a set screw 12 which holds the tool firmly in place. This cylindrical end 9 is integral with an enlarged dovetail end 13 of a size to fit into the dovetail 3 of the chuck body. In one end of the dovetail 13 a slot 14, open at one end and threaded at 15 in its bottom, is provided. A threaded screw 16 carries a split anchor piece 17 which extends outwardly therefrom and terminates in a small dovetail end 18 which fits into the dovetail 5. A tapered opening 19 receives a taper-headed set screw 20 which screws into the opening 5a.

In starting to work, the anchor arm 17 is slid into place with the dovetail 18 engaging the dovetail 5 and the set screw 20 tightened down against the sides of its hole 19 by engaging the threads of the opening 5a. The dovetail end 13 of the chuck head is then inserted into the dovetail end 3 of the body in such manner that the screw 16 may engage the threads of the hole 15, the threads being started. Next the end 7 of the shank 6 is threaded into the opening 2 of the chuck body for a distance such that its end approaches or lightly engages the end of the dovetail 13. The chuck may then be inserted in a machine adapted to receive and to drive the shank 6 so that the adjustment of the chuck with respect to the work may be observed or final adjustment may be made before insertion into a machine. A tool or bit is inserted in the opening 10 and fixed therein by the set screw 12. The screw 16 is rotated thus traversing the head 8 to or across the axis of the chuck body by the distance desired by the operator whereupon the body 1 is rotated on the shank so that the end of the shank forces the sidewalls of the dovetail 13 firmly against the sidewalls of the dovetail 3. A short set screw 21 having its axis normal to the direction of travel of the dovetail 13 is then tightened against a soft metal plug 22 preferably provided with a segment of threads similar to the threads on the end 7 of the shank 6. This forces the plug 22 into firm engagement with the end 7 and locks the shank against accidental rotation. The chuck is then ready for use.

In order to change a tool it is merely necessary to loosen the set screw 12 and remove the first tool. In order to make a new setting the screw 21 is backed away from the plug 22 thus permitting traversal of the head 8 by rotation of the screw 16. In order to compensate for wear in the dovetails 13 or 3 it is merely necessary to back off the set screw 21 from the plug 22, rotate the shank 6 to firm engagement with the dovetail 13 and re-tighten the set screw 21 against its plug 22.

It will be noted that the tool opening 10 extends entirely through the chuck head thus allowing ample room for the usual boring tool. For special tools I may provide further depth by extending the opening into the shank end 7 as best indicated at 23 in Figure 2.

Various changes may be made without departing from the spirit of my invention and I therefore desire to be extended protection within the scope of the appended claims.

What I claim is:

1. A boring chuck comprising a chuck body having a threaded opening extending axially thereinto for a substantial distance from one end thereof, said body having a dovetail slot with converging sidewalls transversely across the other end thereof, a chuck head having a dovetail end with diverging sidewalls adapted to fit into said dovetail slot, a shank having one end threaded to engage the threads of the opening of said body and traversable into said threads into pressure engagement with the dovetails of said head whereby said head is rigidified with said body, said body having a second threaded opening therethrough radially of said first opening, a plug in said second opening carrying a segment of threads for engagement with the threads of said shank and a set screw in said second opening traversable into pressure engagement with said plug to retain said shank against rotation with respect to said body.

2. A boring chuck comprising a chuck body having a threaded opening extending axially thereinto for a substantial distance from one end thereof, said body having a dovetail slot with converging sidewalls transversely across the other end thereof, a chuck head having a dovetail end with diverging sidewalls adapted to fit into said dovetail slot and a shank having one end threaded to engage the threads of the opening of said body and traversable into said threads into pressure engagement with the dovetails of said head whereby said head is rigidified with said body, said head having an opening longitudinally through the entire length thereof to receive a tool, and a set screw transversely thereof for holding the tool in rigid engagement therewith.

3. The combination as set forth in claim 2 in which the shank also has an opening extending centrally thereinto in continuance of the opening in said head.

HARRY F. BROWN.